Patented Dec. 31, 1935

2,025,876

UNITED STATES PATENT OFFICE 2,025,876

PREPARATION OF ARYL-AMINES

Herbert August Lubs and John Elton Cole, Wilmington, Del., assignors to E. I. du Pont de Nemours & Company, Wilmington, Del., a corporation of Delaware No Drawing. Application April 11, 1931,
Serial No. 529,540

7 Claims. (Cl. 260—130.5)

This invention relates to the preparation of organic chemical compounds, more specifically to the preparation of aryl amines. In particular it relates to the treatment of arylated amino-aryl-thiazoles having the probable formula

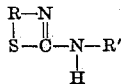

in which R and R' represent aryl nuclei which may be alike or different and which may be substituted, to simultaneously produce a plurality of aryl amines, one of which has a mercapto group in a position ortho to the amino group.

This invention has for an object the production of new chemical compounds and new chemical processes. Other objects are the simultaneous production of different dyestuff intermediates having valuable properties and in general an advancement of the art.

These objects are accomplished by the present invention whereby aryl-amino-aryl-thiazoles having the formula

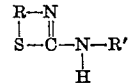

are hydrolyzed to simultaneously produce aryl amines having the formulae

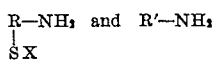

X being an alkali metal; and where the compounds having the Formula (I) are further treated with chloracetic acid to produce amino-aryl-thio-glycolic acids.

The invention will be further understood from a consideration of the following examples in which the parts are given by weight.

Example I

Fifteen (15) parts of the hydrochloride of 1-para-chloro-ortho-toluidino-3-methyl-5-chloro-benzothiazole were mixed with 25 parts of 95% ethyl alcohol, 50 parts of water and 25 parts of 30% sodium hydroxide. This mixture was heated in an iron bomb for six hours at 200° C. Thereafter it was cooled and the resultant mixture diluted to 200 parts and the precipitate consisting of 1-amino-2-methyl-4-chloro-benzene was removed by filtration. The filtrate was treated with 5 parts of finely ground chloracetic acid. This mixture was warmed to 50° C. and held at that temperature until a test showed it to be free from mercapto groups. The clear solution contained the sodium salt of 1-thioglycolic-2-amino-3-methyl-5-chloro-benzene.

Example II

Ten (10) parts of 1-para-chloro-ortho-toluidino-3-methyl-5-chloro-benzothiazole was heated under reflux for about one hour with 60 parts of caustic potash and 20 parts of water. After cooling and diluting to 200 parts the mass was steam distilled to remove the chloro-amino-toluene which was identified as 1-amino-2-methyl-4-chloro-benzene by conversion to its acetyl derivative. The alkaline aqueous residue was treated with chloracetic acid as above described and the thioglycolic acid thus formed was shown to be 1-thioglycol-2-amino-3-methyl-5-chloro-benzene by comparing its lactam with the lactam of the compound of known composition.

Example III

Thirty-three (33) parts of 1-ortho-para-dichloro-anilido-5-chloro-benzothiazole was mixed with 50 parts of 95% ethyl alcohol and 60 parts of 30% sodium hydroxide. This mixture was heated at 200° C. for four hours in a bomb. After cooling and dilution to 300 parts with water the precipitate which formed was removed by filtration. It was shown to be 1-amino-2:4-di-chloro-benzene by its melting point (60° C.) and the melting point of its acetyl derivative (146°-147° C.). The filtrate was condensed with chloracetic acid (12 parts) in the usual fashion. The 1-thioglycolic-2-amino-5-chloro-benzene was isolated as its lactam and identified by direct comparison with materials of known chemical composition.

The process above described for the simultaneous production of aryl-amines and aryl-amino-mercapto compounds may be applied to the hydrolysis of aryl-amino-aryl-thiazoles in general.

Other alkaline hydrolyzing agents than those described may be used satisfactorily. The procedure is especially desirable for the production of halogenated amines and halogenated amino-mercapto compounds.

In the above description use has been made of the following type of formula

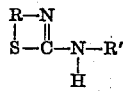

It is realized, however, that these compounds may exist in the tautomeric form having the formula

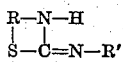

For this reason wherever the first mentioned formula is used in the specification and claims, it is intended to cover the compound regardless of the tautomeric form in which it actually exists.

The compounds produced by this invention are valuable dyestuff intermediates.

We claim:

1. The process of preparing simultaneously 2:4-di-chloro-aniline and 2-mercapto-4-chloro-aniline which comprises hydrolyzing 1-ortho-para-di-chloro-anilido-5-chloro - benzothiazole under alkaline conditions.

2. The process of preparing simultaneously 2-methyl-4-chloro-aniline and 2-mercapto-4-chloro-6-methyl-aniline which comprises hydrolyzing 1-para-chloro - ortho-toluidino-3-methyl-5-chloro-benzothiazole under alkaline conditions.

3. The process which comprises hydrolyzing, under alkaline conditions, a compound having the formula:

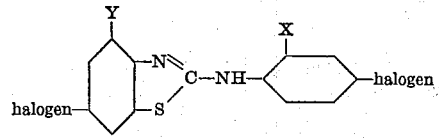

in which X is halogen or alkyl and Y is alkyl or hydrogen.

4. The process which comprises hydrolyzing, under alkaline conditions, a compound having the formula:

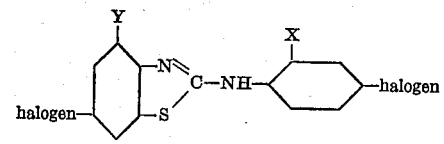

in which X is a chlorine atom or a methyl radical and Y is a hydrogen atom or a methyl radical.

5. The process which comprises hydrolyzing, under alkaline conditions, a compound having the formula:

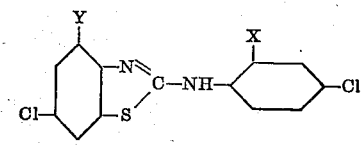

in which X is a chlorine atom or a methyl radical and Y is a hydrogen atom or a methyl radical.

6. The process of producing a mixture of 1-amino-2-methyl-4-chlorobenzene and 1-mercapto-2-amino-3-methyl-5-chlorobenzene, which comprises heating together in a closed vessel and at a temperature of about 200° C. substantially 15 parts of 1 - para-dichloro-ortho-toluidino - 3 - methyl-5-chloro-benzothiazole hydrochloride, 25 parts of alcohol, 50 parts of water and 25 parts of 30% sodium hydroxide.

7. The process of producing a mixture of 1-amino-2,4-dichlorobenzene and 1-mercapto-2-amino-5-chlorobenzene, which comprises heating together in a closed vessel and at a temperature of about 200° C., substantially 33 parts of 1-ortho-para-dichloro-anilido-5-chloro-benzothiazole, 50 parts of alcohol and 60 parts of 30% aqueous sodium hydroxide.

HERBERT AUGUST LUBS.
JOHN ELTON COLE.